United States Patent
Otake et al.

(10) Patent No.: US 7,062,906 B2
(45) Date of Patent: Jun. 20, 2006

(54) REGENERATION OF PARTICULATE FILTER

(75) Inventors: Makoto Otake, Yokohama (JP);
Junichi Kawashima, Yokosuka (JP);
Takao Inoue, Yokohama (JP); Terunori Kondou, Yokohama (JP); Toshimasa Koga, Yokohama (JP); Naoya Tsutsumoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 121 days.

(21) Appl. No.: 10/790,119

(22) Filed: Mar. 2, 2004

(65) Prior Publication Data
US 2004/0172935 A1 Sep. 9, 2004

(30) Foreign Application Priority Data
Mar. 3, 2003 (JP) ........................ 2003-055658

(51) Int. Cl.
*F01N 3/00* (2006.01)

(52) U.S. Cl. .................. 60/295; 60/274; 60/285; 60/297; 60/311

(58) Field of Classification Search .............. 60/285, 60/295, 297, 311, 274
See application file for complete search history.

(56) References Cited

U.S. PATENT DOCUMENTS

| | | |
|---|---|---|
| 4,719,751 A | 1/1988 | Kume et al. |
| 4,835,964 A | 6/1989 | Kume et al. |
| 5,319,930 A * | 6/1994 | Shinzawa et al. ............. 60/286 |
| 6,622,480 B1 * | 9/2003 | Tashiro et al. ................ 60/295 |
| 2004/0055279 A1 | 3/2004 | Plote et al. |

FOREIGN PATENT DOCUMENTS

| | | |
|---|---|---|
| DE | 100 56 034 A1 | 5/2002 |
| EP | 1 108 866 A2 | 6/2001 |
| EP | 1 273 779 A2 | 1/2003 |
| EP | 1 350 934 A1 | 10/2003 |
| EP | 1 353 050 A1 | 10/2003 |
| JP | 60-216018 A | 10/1985 |
| JP | 6-58137 A | 3/1994 |

* cited by examiner

*Primary Examiner*—Thomas Denion
*Assistant Examiner*—Diem Tran
(74) *Attorney, Agent, or Firm*—Foley & Lardner LLP

(57) ABSTRACT

A regeneration device for a filter (13) which traps particulate matter in an exhaust gas of an engine (1) is disclosed. The regeneration device has a sensor (25) which detects an engine running point containing an engine load and a controller (22) storing a map which defines a low load region (A) relating to engine running points. The controller (22) determines whether or not the detected engine running point is in the low load region referring to the map, when the deposition amount of particulate matter is more than a first reference amount (PMn). Further, the controller (22) immediately start a first filter regeneration control by raising a temperature of the exhaust gas, when the detected engine running point is not in the low load region, and start a second filter regeneration control by raising the temperature of the exhaust gas after the deposition amount of particulate matter exceeds a second reference amount (PMe), when the detected engine running point is in the low load region.

18 Claims, 3 Drawing Sheets

REGENERATION OF PARTICULATE FILTER

FIELD OF THE INVENTION

This invention relates to an engine exhaust gas purification device, and more particularly, to improvement of a technique for regenerating a filter which traps particulate matter (PM) in engine exhaust gas.

BACKGROUND OF THE INVENTION

Tokkai Hei-No. 6-58137 published by the Japan Patent Office in 1994 discloses an exhaust gas purification device for purifying particulate matter discharged from an engine. This device comprises a filter in an engine exhaust gas system, and regenerates the filter by oxidizing or burning trapped particulate matter at a fixed interval.

SUMMARY OF THE INVENTION

In order to burn the particulate matter collected by the filter, the temperature of the filter may be increased by raising the exhaust gas temperature by engine control. Specifically, the exhaust gas temperature can be raised by retarding the fuel injection timing or performing a post-injection of fuel. However, as fuel economy is poorer when the engine is idle, filter regeneration is prohibited. This is because when the engine is idle, engine temperature is low, so a large increase of exhaust gas temperature is required. Thus, if idle running of the engine continues for a long time, too much particulate matter will accumulate in the filter.

It is therefore an object of this invention to provide a regeneration device which appropriately regenerates a filter even during idle running of an engine.

In order to achieve the above object, this invention provides a regeneration device for a filter which traps particulate matter in an exhaust gas of an engine, the regeneration device comprising a sensor which detects an engine running point containing an engine load and a controller comprising a map which defines a low load region relating to engine running points. The controller is programmed to compute a deposition amount of particulate matter in the filter based on the detected engine running point and determine whether or not the detected engine running point is in the low load region referring to the map, when the deposition amount of particulate matter is more than a first reference amount. The controller is further programmed to immediately start a first filter regeneration control by raising a temperature of the exhaust gas, when the detected engine running point is not in the low load region, and start a second filter regeneration control by raising the temperature of the exhaust gas after the deposition amount of particulate matter exceeds a second reference amount, when the detected engine running point is in the low load region. Here, the second reference amount is larger than the first reference amount.

This invention further provides a regeneration method for regenerating a filter which traps particulate matter in an exhaust gas of an engine. The method comprises the steps of storing a map which defines a low load region relating to engine running points, detecting an engine running point containing an engine load, computing a deposition amount of particulate matter in the filter based on the detected engine running point, determining whether or not the detected engine running point is in the low load region referring to the map when the deposition amount of particulate matter is more than a first reference amount. The method further comprises the steps of immediately raising a temperature of the exhaust gas when the detected engine running point is not in the low load region and raising the temperature of the exhaust gas after the deposition amount of particulate matter exceeds a second reference amount when the detected engine running point is in the low load region.

The details as well as other features and advantages of this invention are set forth in the remainder of the specification and are shown in the accompanying drawings.

DETAILED DESCRIPTION OF THE INVENTION

Figure 1:
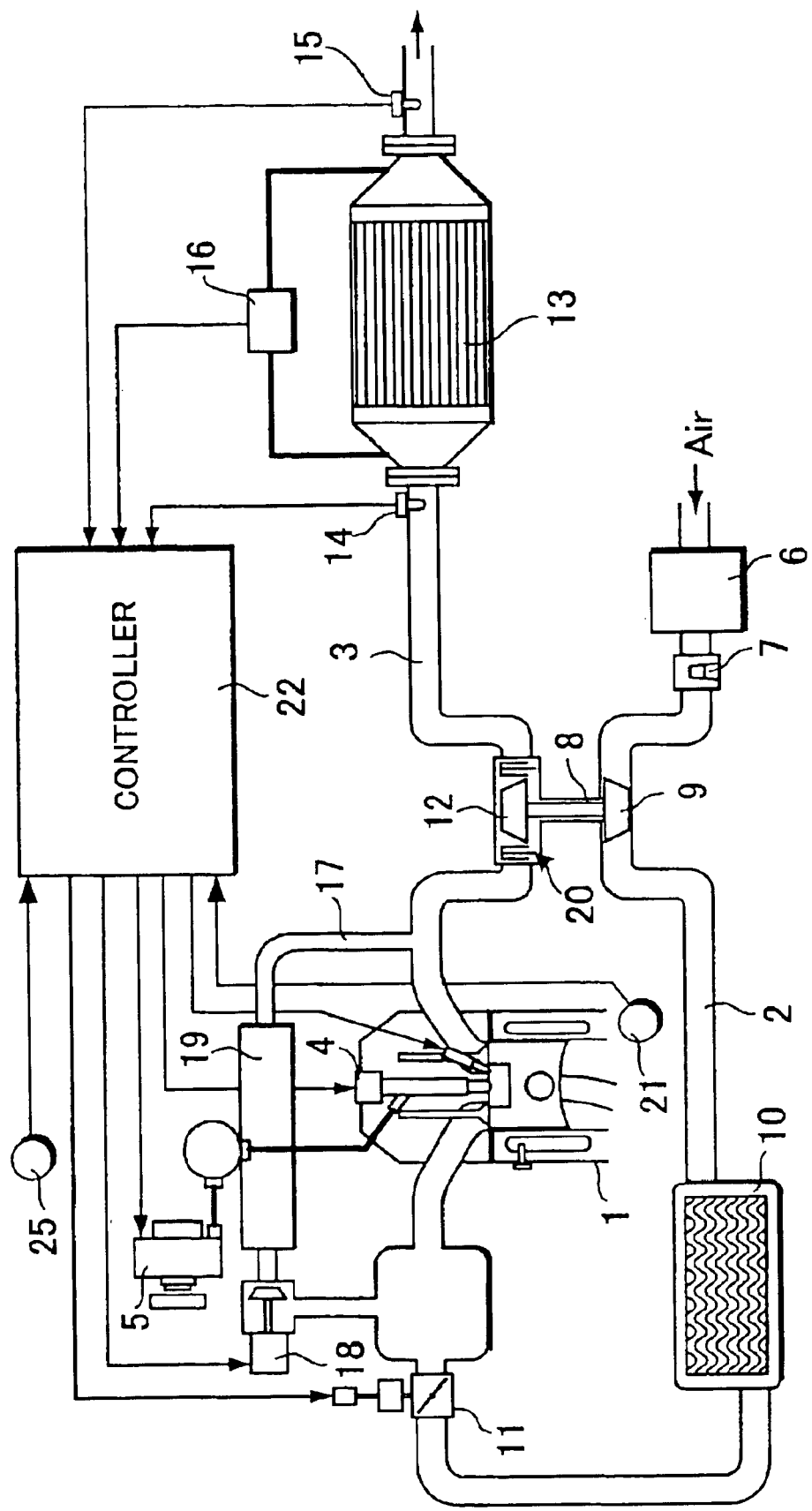
FIG. 1 is a schematic diagram of an engine system which applies the exhaust gas purification device of the present invention.

FIG. 1 shows an example of an engine system which applies this invention. An engine system 1 comprises an engine 1 (specifically a diesel engine), air intake passage 2 and exhaust gas passage 3. A fuel injector 4 and a fuel injection pump 5 are provided for the engine 1. An air cleaner 6, air flowmeter 7, compressor 9 of an exhaust gas turbocharger 8, intercooler 10 and throttle valve 11 are arranged successively from the upstream side in an air passage 2. A turbine 12 of the exhaust gas turbocharger 8 and a filter 13 (specifically a diesel particulate filter) are arranged successively from the upstream side in an exhaust gas passage 3. The filter 13 collects particulate matter (PM). The exhaust gas purification device is provided with the filter 13, a temperature sensor 14 which detects the inlet temperature of the filter 13, a temperature sensor 15 which detects the outlet temperature of the filter 13, a pressure sensor 16 which detects the differential pressure ΔP across the filter 13, a controller 22, an engine load detection sensor which detects engine load and an engine speed sensor which detects the rotation speed of the engine 1. The engine load detection sensor may be an accelerator pedal stroke sensor 25 which detects a stroke amount of an accelerator pedal (not shown) as an engine load Q, and the engine speed sensor may be a crank angle sensor 21 which detects the rotation speed of the engine 1 and the crank position of the engine 1.

The engine system further comprises an exhaust gas recirculation (EGR) passage 17 which connects the air intake passage 2 and the exhaust gas passage 3. An EGR valve 18 and EGR cooler 19 are disposed in the middle of the EGR passage 17. The exhaust gas turbocharger 8 is provided with a variable nozzle 20 which can increase/decrease the flowrate of the exhaust gas flowing into the turbine 12.

The controller 22 comprises a microcomputer provided with a CPU which executes programs, a read-only memory (ROM) which stores programs and data, a random access memory (RAM) which temporarily stores the operation result of the CPU and acquired data, a timer which measures time, and an input/output interface (I/O interface).

The controller 22 controls the fuel injection timing of the fuel injector 4, the fuel injection amount of the fuel injector 4, the throttle valve opening, the EGR amount and a variable nozzle opening based on signals from sensors. The controller 22 is further provided with a deposition amount computation means in the form of a set of instruction codes which computes the PM deposition amount of the filter 13, and a regeneration control means in the form of a set of instruction codes which raises exhaust gas temperature by controlling the engine.

Figure 2:
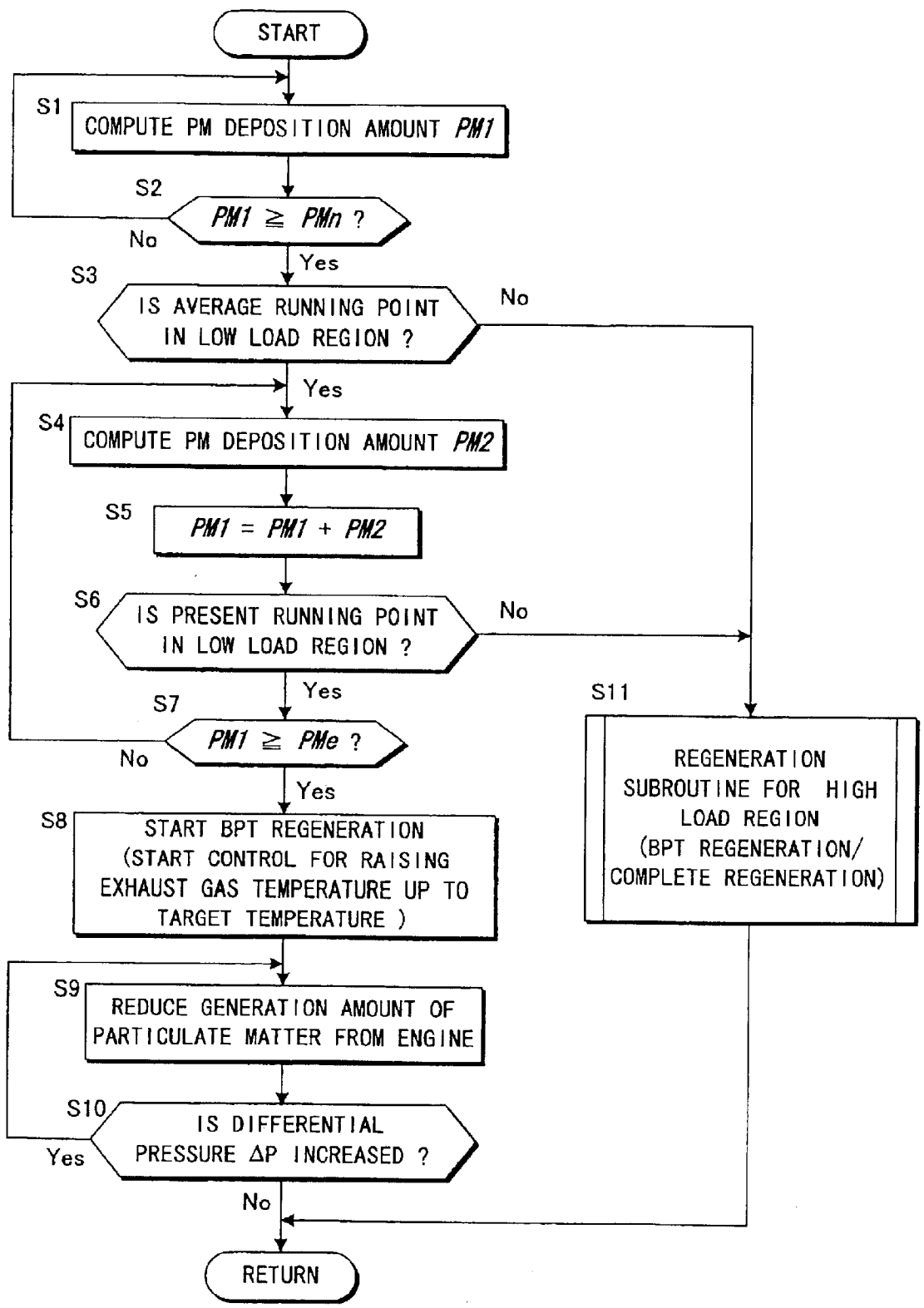
FIG. 2 is a flow chart showing a filter regeneration control performed by the controller of the present invention.

FIG. 2 shows the filter regeneration control routine performed by the controller 22. The control routine is implemented as a program or programs executed by the controller 22. This control routine is repeatedly performed.

In a step S1, a PM deposition amount PM1 is computed from the engine load Q and the engine speed Ne. The controller 22 may read the engine load Q from the engine load detection sensor. Otherwise, a fuel injection amount command value determined by the controller 22 in response to a signal from the accelerator pedal stroke sensor 25 may be read as the engine load Q. The engine speed Ne is read from the crank angle sensor 21.

The various methods of computing the PM deposition amount PM1 are known. For example, the present PM deposition amount PM1 is calculated by integrating the read value of the PM discharge rate f(Q, Ne) over time as follows: PM1=PM1(i)=PM(i−1)+f(Q, Ne).

Figure 3:
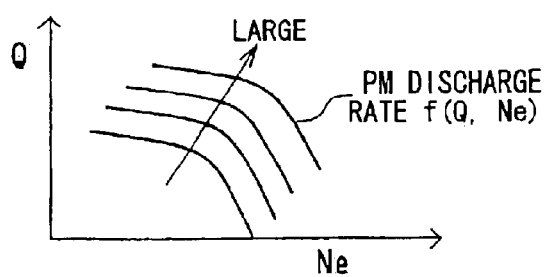
FIG. 3 is a map for computing a PM deposition amount used for filter regeneration control.

Here, PM(i−1) is the PM deposition amount calculated and stored on the immediately preceding occasion of the execution of the step S1. PM1(i) is the present PM deposition amount. The PM discharge rate f(Q, Ne) is the amount of the PM discharged from the engine in a predetermined time interval $\Delta t1$ at which the step S1 is repeated. The PM discharge rate f(Q, Ne) is determined based on the engine load Q and the engine speed Ne by looking up the map of FIG. 3. This map defines the PM discharge rate f (Q, Ne) relative to the engine load Q and the engine speed Ne, and is generated experimentally. For example, the map is stored in the ROM. When the control routine starts, PM(i−1) is set as an initial value PM0. When the control routine starts after the filter is regenerated completely (after a step S11), the initial value PM0 is zero. When the control routine starts after the filter is regenerated incompletely (after a step S10), the initial value PM0 is not zero. For example, after the step S10 the initial value PM0 may be set at a value close to PMe described hereafter.

In a step S2, it is determined whether or not the PM deposition amount PM1 is more than a first reference amount PMn. When the PM deposition amount PM1 is less than the first reference amount PMn (PM1<PMn), it is not necessary to carry out filter regeneration, so the routine returns to the step S1. When the PM deposition amount PM1 is more than the first reference amount PMn (when PM1≧PMn), the routine proceeds to a step S3.

In the step S3, it is determined whether or not the average running point of the engine is in a low load region. In order to ensure stability of control, the average of the running points over a predetermined period (for example the past 5 minutes) is computed. The running points (Q, Ne) detected over the past 5 minutes may be stored in the RAM for the computation of the average. It is determined where the average running point (aveQ, aveNe) is on the map shown in FIG. 4. The map of FIG. 4 stored in the ROM defines a low load region (region "A" of FIG. 4) and high load region of engine running. The low load region contains one or more running points for idle running. All engine running points of the low load region may be engine running points during idle running. In the running range determination of the step S3, when the engine running point is in the low load region, the routine proceeds to a step S4.

In the step S4, by a method similar to that of the step S1, a PM deposition amount PM2 in the low load region is calculated by integrating the PM discharge rate f(Q, Ne) over time.

Subsequently, in a step S5, the result of adding PM2 to PM1 is newly set as PM1. In other words, PM1 is updated.

Figure 4:
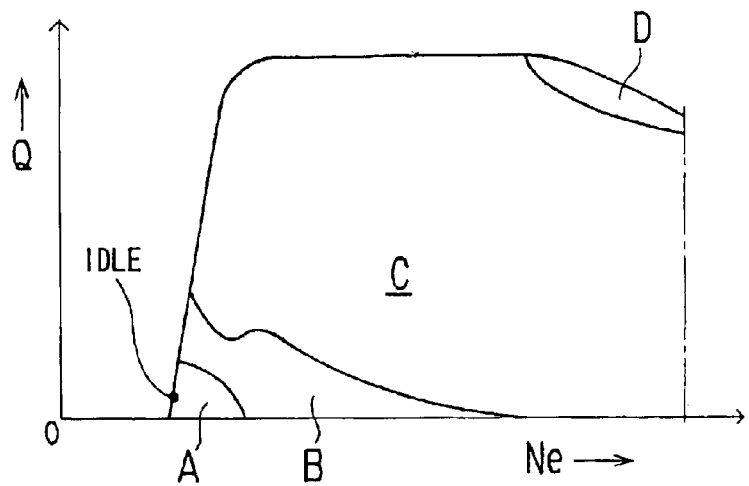
FIG. 4 is a map for defining an engine running range.

Next, in a step S6, it is again determined whether or not the engine running point is in the low load region (region "A" of FIG. 4). The engine running point is the present momentary running point, and is not an average. When the determination of the step S6 is affirmative, the routine proceeds to a step S7. When the determination of the step S6 is negative, regeneration for high load is performed (step S11). Thus, based on the momentary running status of the engine, the regeneration for high load can be promptly selected if required.

Figure 5:
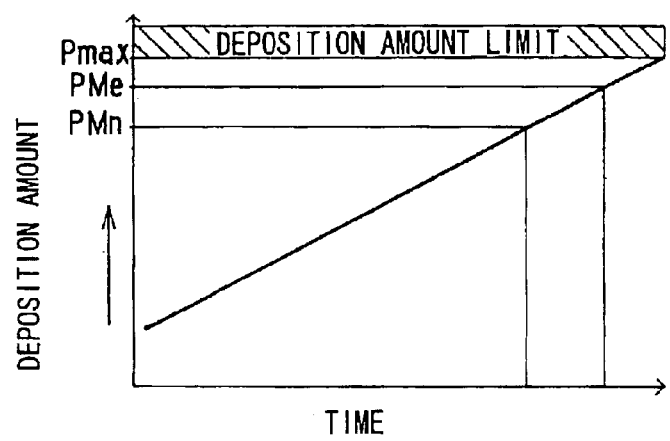
FIG. 5 is a graph describing a deposition amount reference value and the temporal variation of the deposition amount.

In the Step S7, the present PM deposition amount PM1 is compared with a second reference amount PMe. As shown in FIG. 5, the second reference amount PMe is larger than the first reference amount PMn, and is set to be a value less than a maximum allowable deposition amount Pmax of the filter 13. For example, the first reference amount PMn is 70% of Pmax and the second reference amount PMe is 90% of Pmax. The allowable maximum deposition amount Pmax may be an amount above which engine trouble occurs due to the blockage of the filter 13 or may be an amount above which PM is discharged to the outside through the filter 13. When PM1<PMe, the routine returns to the step S4, and as long as the engine running point is in the low load region, the computation of PM2 and updating of PM1 are repeated.

When PM1≧PMe, a balance-point (BPT) regeneration of the filter 13 is performed in a step S8–S10 (second filter regeneration control). Here, the PM amount removed from the filter 13 by combustion and the PM amount newly flowing into the filter 13 are balanced by performing a control which reduces the generation amount of PM from the engine 1 in parallel with a control which raises exhaust gas temperature. Therefore, regeneration is performed such that the PM deposition amount in the filter 13 is maintained at a constant value nearly equal to the second reference amount PMe. It should be noted that it is difficult to burn the PM in the filter 13 completely in the low load region. Thus, impairment of fuel consumption due to filter regeneration is suppressed because the PM in the filter 13 is not completely burnt. The second filter regeneration control of the step S8–S10 may be performed only at engine running points during idle running by setting the low load region to an idle running region of the engine.

In the step S8, exhaust gas temperature control is carried out so as to raise the exhaust gas temperature to a target exhaust gas temperature of about 400° C. Various techniques are known to raise the exhaust gas temperature. For example, in the engine system shown in FIG. 1, the exhaust gas temperature may be raised by controlling intake air amount by the throttle valve 11, retarding main fuel injection timing, increasing the amount of post-injection of fuel, or retarding post-injection timing. Post-injection of fuel means performing an additional fuel injection after the main fuel injection. Thereby, the target exhaust gas temperature of about 400° C. is achieved for filter regeneration (for combustion of PM). In addition, by increasing the load of auxiliary devices such as an air-conditioner compressor or AC dynamo, the engine speed can be increased by an idle-up device and thus the exhaust gas temperature can be raised. The controller 22 performs at least one of fuel injection timing control, fuel injection amount control, intake air amount control and auxiliary device load control so as to raise the temperature of the exhaust gas. Further, in the step S8, the controller 22 stores the differential pressure ΔP detected by the pressure sensor 16 in the RAM.

In the step S9, engine control is performed to suppress the generation amount of PM from the engine 1. In order that the PM deposition amount in the filter 13 does not increase due to rise of exhaust gas temperature, the controller 22 controls the amount of PM flowing into the filter 13 in addition to the exhaust gas temperature. The amount of PM flowing into the filter 13 can be reduced by reducing the generation amount of PM from the engine 1.

As a method for suppressing the generation amount of PM, any of the methods known in the art may be applied such as reducing the EGR amount by decreasing the opening of the EGR valve 18, reducing a pilot injection amount of the fuel injector 4, expanding the pilot injection interval, and intensifying swirl via a swirl control valve.

In the following step S10, it is determined whether or not the differential pressure ΔP is increased. The controller 22 determines whether or not the differential pressure ΔP is increased by comparing the differential pressure ΔP detected by the pressure sensor 16 with the stored differential pressure in the step S8. When the differential pressure ΔP is increased, the controller 22 repeats the processing of the steps S9 and S10 until the increase in differential pressure ΔP stops. An increase in the differential pressure ΔP indicates that the PM amount removed from the filter 13 is smaller than the PM amount flowing into the filter 13. When the differential pressure ΔP is not increased, the routine is terminated.

On the other hand, in the determination of the step S3 or step S6, when it is determined that the engine running point is not in the low load region, a regeneration subroutine in the high load region is carried out in the step S11 (first filter regeneration control). In this subroutine, when the engine running point is in the comparatively low load region "B" of the map of FIG. 4, the above-mentioned BPT regeneration is performed in order to suppress impairment of fuel consumption performance. When the engine running point is in the region "C" where the load is high and the exhaust gas heat amount is also large, complete regeneration is performed until there is no more deposited PM because the extra fuel amount required for complete regeneration of the filter is small. When the engine running point is in a natural regeneration region "D", it is not necessary to raise exhaust gas temperature, and a sufficient exhaust gas temperature for regeneration is obtained without a filter regeneration control.

According to the present invention, by setting the reference value at which engine control for filter regeneration is started in two steps according to the engine running state, deposition of exhaust gas PM can be suppressed while reducing the number of times to raise the exhaust gas temperature, which tends to impair fuel consumption performance during low load running.

The entire contents of Japanese Patent Application P2003-55658 (filed Mar. 3, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A regeneration device for a filter which traps particulate matter in an exhaust gas of an engine, comprising:
   a sensor which detects an engine running point containing an engine load,
   a controller comprising a map which defines a low load region relating to engine running points, the controller being programmed to:
   compute a deposition amount of particulate matter in the filter,
   determine whether or not the detected engine running point is in the low load region referring to the map, when the deposition amount of particulate matter is more than a first reference amount,
   immediately start a first filter regeneration control by raising a temperature of the exhaust gas, when the detected engine running point is not in the low load region, and
   start a second filter regeneration control by raising the temperature of the exhaust gas after the deposition amount of particulate matter exceeds a second reference amount, when the detected engine running point is in the low load region,
   wherein the second reference amount is larger than the first reference amount.

2. The regeneration device as defined in claim 1, wherein the low load region contains one or more engine running points during idle running.

3. The regeneration device as defined in claim 1, wherein all engine running points of the low load region are engine running points during idle running.

4. The regeneration device as defined in claim 1, wherein the controller is programmed to compute the deposition amount of particulate matter in the filter based on the detected engine running point.

5. The regeneration device as defined in claim 1, wherein the second filter regeneration control is a control which balances an amount of particulate matter removed from the filter by combustion and an amount of particulate matter newly flowing into the filter.

6. The regeneration device as defined in claim 1, wherein the first filter regeneration control is a control which balances an amount of particulate matter removed from the filter by combustion and an amount of particulate matter newly flowing into the filter.

7. The regeneration device as defined in claim 1, wherein the first filter regeneration control is a control which burns particulate matter completely.

8. The regeneration device as defined in claim 1, wherein the controller is programmed to determine whether or not an average running point over a predetermined period is in the low load region referring to the map.

9. The regeneration device as defined in claim 1, wherein the controller is further programmed to:
   determine whether or not an engine running point during the second filter regeneration control is in the low load region by referring to the map, and
   immediately start the first filter regeneration control when the engine running point during the second filter regeneration control is not in the low load region.

10. The regeneration device as defined in claim 1, wherein the controller is programmed to perform at least one of fuel injection timing control, fuel injection amount control, intake air amount control and auxiliary device load control, so as to raise the temperature of the exhaust gas.

11. The regeneration device as defined in claim 1, further comprising a sensor which detects a rotation speed of the engine, wherein an engine running point is a set of the engine load and the rotation speed.

12. The regeneration device as defined in claim 1, further comprising a sensor which detects a rotation speed of the engine, wherein the controller comprises a map which gives a discharge rate of particulate matter based on the engine load and the rotation speed of the engine, and is programmed to compute the deposition amount of the particulate matter in the filter by integrating the discharge rate over time.

13. A regeneration device for a filter which traps particulate matter in an exhaust gas of an engine, comprising:

means for storing a map which defines a low load region relating to engine running points, means for detecting an engine running point containing an engine load, means for computing a deposition amount of particulate matter in the filter based on the detected engine running point, means for determining whether or not the detected engine running point is in the low load region referring to the map, when the deposition amount of particulate matter is more than a first reference amount, means for immediately raising a temperature of the exhaust gas, when the detected engine running point is not in the low load region, and means for raising the temperature of the exhaust gas after the deposition amount of particulate matter exceeds a second reference amount, when the detected engine running point is in the low load region, wherein the second reference amount is larger than the first reference amount.

14. The regeneration device as defined in claim 13, wherein the means for raising a temperature of the exhaust gas comprises means for balancing an amount of particulate matter removed from the filter by combustion and an amount of particulate matter newly flowing into the filter.

15. The regeneration device as defined in claim 13, wherein the means for immediately raising a temperature of the exhaust gas comprises means for balancing an amount of particulate matter removed from the filter by combustion and an amount of particulate matter newly flowing into the filter.

16. The regeneration method as defined in claim 14, wherein the step of immediately raising a temperature of the exhaust gas comprises balancing an amount of particulate matter removed from the filter by combustion and an amount of particulate matter newly flowing into the filter.

17. The regeneration method as defined in claim 14, wherein the step of raising a temperature of the exhaust gas comprises balancing an amount of particulate matter removed from the filter by combustion and an amount of particulate matter newly flowing into the filter.

18. A regeneration method for regenerating a filter which traps particulate matter in an exhaust gas of an engine, comprising:

storing a map which defines a low load region relating to engine running points, detecting an engine running point containing an engine load, computing a deposition amount of particulate matter in the filter based on the detected engine running point, determining whether or not the detected engine running point is in the low load region referring to the map, when the deposition amount of particulate matter is more than a first reference amount, immediately raising a temperature of the exhaust gas, when the detected engine running point is not in the low load region, and raising the temperature of the exhaust gas after the deposition amount of particulate matter exceeds a second reference amount, when the detected engine running point is in the low load region, wherein the second reference amount is larger than the first reference amount.

* * * * *